US007865442B1

(12) United States Patent
Sowell (10) Patent No.: US 7,865,442 B1
(45) Date of Patent: Jan. 4, 2011

(54) DISTRIBUTING AND BILLING SOFTWARE ACCORDING TO CUSTOMER USE OF PROGRAM MODULES

(75) Inventor: Timothy Charles Sowell, Newport Beach, CA (US)

(73) Assignee: Invensys Systems, Inc., Foxboro, MA (US)

( * ) Notice: Subject to any disclaimer, the term of this patent is extended or adjusted under 35 U.S.C. 154(b) by 1634 days.

(21) Appl. No.: 09/418,943

(22) Filed: Oct. 15, 1999

(51) Int. Cl.
*G06Q 30/00* (2006.01)
(52) U.S. Cl. .............................. 705/59; 705/36; 705/52; 705/53; 713/189; 713/200
(58) Field of Classification Search ................... 705/36, 705/52, 53, 59, 1, 26, 27; 713/189, 200
See application file for complete search history.

(56) References Cited

U.S. PATENT DOCUMENTS

| 5,023,907 | A |   | 6/1991  | Johnson et al. |        |
|-----------|---|---|---------|----------------|--------|
| 5,649,187 | A | * | 7/1997  | Hornbuckle     | 705/52 |
| 5,708,709 | A | * | 1/1998  | Rose           | 705/59 |
| 5,745,879 | A |   | 4/1998  | Wyman          | 705/1  |
| 5,790,664 | A | * | 8/1998  | Coley et al.   | 705/59 |
| 5,825,883 | A | * | 10/1998 | Archibald et al. | 705/53 |
| 5,905,860 | A |   | 5/1999  | Olsen et al.   |        |
| 5,925,127 | A | * | 7/1999  | Ahmad          | 713/200 |
| 5,930,357 | A |   | 7/1999  | Fukui          | 380/4  |
| 5,935,243 | A |   | 8/1999  | Hasebe et al.  | 713/200 |
| 5,940,504 | A |   | 8/1999  | Griswold       | 380/4  |
| 6,049,789 | A | * | 4/2000  | Frison et al.  | 705/59 |
| 6,059,838 | A | * | 5/2000  | Fraley et al.  | 717/108 |
| 6,073,124 | A | * | 6/2000  | Krishnan et al. | 705/59 |
| 6,363,486 | B1 | * | 3/2002 | Knapton, III   | 713/200 |

(Continued)

FOREIGN PATENT DOCUMENTS

EP          0332304 A2     9/1989

(Continued)

OTHER PUBLICATIONS

Headington at al. "Data Abstraction and Structures using C++ ", 1994, pp. 110-116.*

(Continued)

*Primary Examiner*—Nga B. Nguyen
(74) *Attorney, Agent, or Firm*—Leydig, Voit & Mayer Ltd.

(57) ABSTRACT

A software brokering method and framework are presented. The software brokering method includes a step of establishing a use-based pricing scheme for a set of software modules that are utilized at a customer's site. By pricing software according to its use rather than a set fee, flexible pricing is facilitated for meeting the broad spectrum of customers needs. The software modules are distributed to customers. The software modules are preferably downloaded from an e-commerce site, but may also be mailed or distributed from conventional retail outlets. Use of the software at a customer's site is monitored by processes integrated into the deployment and execution components of a software module integration platform residing at the customer's site. Customers are charged based upon their actual use of the software modules, as registered by the software module integration platform, in view of the software pricing scheme established for the downloaded software modules.

In a preferred embodiment, the software modules are distributed and monitored through an e-commerce site.

47 Claims, 7 Drawing Sheets

U.S. PATENT DOCUMENTS 6,499,035 B1 * 12/2002 Sobeski .................. 707/103 R
6,647,495 B1 * 11/2003 Takeuchi et al. ............ 713/189

FOREIGN PATENT DOCUMENTS

WO          WO 93/11480 A     10/1993
WO          WO 98/58306 A1    12/1998

OTHER PUBLICATIONS

Notification of Transmittal of the International Search Report or the Declaration, for PCT/US00/28155, dated Feb. 26, 2001.

"Tracking Concurrent Usage License Products Installed on Client's Machine" IBM Technical Disclosure Bulletin, IBM Corp., New York, US, vol. 37. No. 8, Aug. 1, 1994, p. 345.

"Counting Users of an Operating System," IBM Technical Disclosure Bulletin, IBM Corp., New York, US, vol. 38. No. 3, Mar. 1, 1995, pp. 579-581.

Supplementary European Search Report for EP 00 97 0809, dated Feb. 13, 2008.

* cited by examiner

DISTRIBUTING AND BILLING SOFTWARE ACCORDING TO CUSTOMER USE OF PROGRAM MODULES

AREA OF THE INVENTION

The present invention generally relates to the area of computer system software architectures and more particularly business methods and mechanisms for marketing, developing, distributing, licensing, maintaining, auditing and/or billing software provided to customers.

BACKGROUND OF THE INVENTION

Currently one of the computer software industry's greatest marketing challenges is efficiency in the licensing of its products to a wide variety of customers. This challenge spans the entire spectrum of licensing including: pricing, distribution, administration, and policing licensed software. This is especially true in situations where customers have unique software requirements requiring customized packaging of software. Because of the software industry's prior failure to meet the aforementioned challenge, licensing obstacles are a factor in customers' selection of a particular software vendor's services. Moreover, licensing according to specific customer needs can involve a high overhead cost for both the software vendor and the customer. A better software product may be dismissed because of high overhead involved in negotiating a license to use the software.

Large sums of revenue are lost through software piracy and users exceeding the scope of their licenses. For example, a user enters a license to use one copy of a program on a single computer and then exceeds the limits of the license by making copies from the original software and loading the software on multiple computers. Additional unauthorized users acquire and execute the software on their computers. Enforcing such use limitations is difficult because the licensor is typically unable to enter a customer's system or facility to determine how the software is being utilized.

Administering software licenses can also be expensive. In a highly competitive environment, maintaining reasonable profit margins depends upon minimizing all overhead costs, including administration. Because human intervention is usually required to ensure that a customer follows the license terms, license terms are often only sporadically enforced in their entirety—if at all.

Software provides varying degrees of economic value to various users. The inability to accurately monitor how licensed software is being used hampers market research efforts directed at establishing fair pricing arrangements for customers. Licensors cannot accurately gauge the extent to which users obtain value from the licensed software. Thus, it is difficult for software licensors to determine a proper price for using their software.

Under today's typical licensing arrangements all users pay the same price to use software for the life of the system. For example a dairy (running eight hours per day) may pay the same amount of money as a high volume brewery (running 24 hours per day) for using a particular combination of software modules to control an industrial control process—even though the brewer obtains several times more return on its software investment based upon the volume of output from its controlled system.

The above-described pricing scenario involving a large up-front commitment by the customer creates barriers to licensing new systems. A user assumes a large portion of the risk that an installed system will not provide the expected value. In order to provide the assurance required by software customers, flexible, creative licensing solutions for a variety of buyers' mentalities are desirable. For example, small businesses having small, simple systems, typically operate on a small budget and are looking for a supplier that will take into consideration the relatively small volume of use, in comparison to the use of the same software by a much larger installation. On the other hand, large businesses often focus upon the return on investment even in situations where the return cannot be accurately predicted at the time the software is provided to the customer. Finally, original equipment manufacturers have a licensing mentality that they only want to pay for the particular software components that they require.

Known pay-as-you-use systems involve customers remotely connecting to a central computer, logging onto the remote computer system, and then paying for use of the computer system based upon the amount of time they were linked to the computer or alternatively based upon the "CPU" time consumed to execute the customers' requests. In such cases, the software resources are located at, or transferred to, a central site. Such an arrangement introduces a potential bottleneck as a large number of customers become frequent users of the computer system. Furthermore, the communication link between the customer and the computer system may be unacceptable, unreliable, or economically impractical.

Today software system design is moving to an object-oriented approach. Software systems incorporate a set of building blocks and templates known as object classes. The object classes are written by developers having specialized knowledge of a particular task addressed by the object classes. The object classes are used to create and deploy within systems a set of objects having well-defined input and output interfaces and functionality. Because a single class may create an infinite number of objects, a vendor cannot determine what value the customer intends to derive from a particular object class at the time the vendor provides the object classes to the customer.

Software distribution is moving away from traditional sales channels and is gravitating toward e-commerce sales channels. In an e-commerce environment, automating the licensing process and eliminating physical delivery costs have the potential to reduce overhead costs of sales. E-commerce presents its own challenges to the sales/marketing departments of software developers/vendors due to decreased customer contact (feedback) and the lack of flexibility in automated sales programs.

SUMMARY OF THE INVENTION

In recognition of the shortcomings of the prior software distribution facilities, a software brokering method and framework are presented. The software brokering method includes a step of establishing a use-based pricing scheme for a set of software modules that are utilized at a customer's site. By pricing software according to its use rather than a set fee, flexible pricing is facilitated for meeting the broad spectrum of customers needs.

The software modules are distributed to customers. The software modules are preferably downloaded from an e-commerce site, but may also be mailed or distributed from conventional retail outlets.

Customers are not billed for downloading the software modules. Instead, use of the software at a customer's site is monitored by processes integrated into the deployment and execution components of a software module integration platform residing at the customer's site. Customers are charged in accordance with their actual use of the software modules, as registered by the software module integration platform, in view of the software pricing scheme established for the downloaded software modules.

While the above-described invention can be performed through conventional sales and distribution channels. In a preferred embodiment, the software modules are distributed and monitored through an e-commerce site. Users download software modules from listed software offerings at the e-commerce site. The e-commerce site is a centralized repository of customer and software developer information. Customers access the cite for support and other information resources relating to the offerings of the site. License managers report usage by customers back to the e-commerce site. The e-commerce site provides this information to a software brokerage that uses the information to distribute the proceeds of customer's use of the software modules, develop market trend reports regarding use of the software by customers, and to support development of new software products for customers.

In a preferred embodiment of the invention, the software modules are primarily object classes developed according to the object-oriented programming guidelines and standards. In such an embodiment usage of the software modules is determined by monitoring object instances created and executed from downloaded object classes. The use is reported to a local license manager and the customer's credit account is debited according to established billing schedules established for the downloaded software modules.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF A PREFERRED EMBODIMENT

Figure 1:
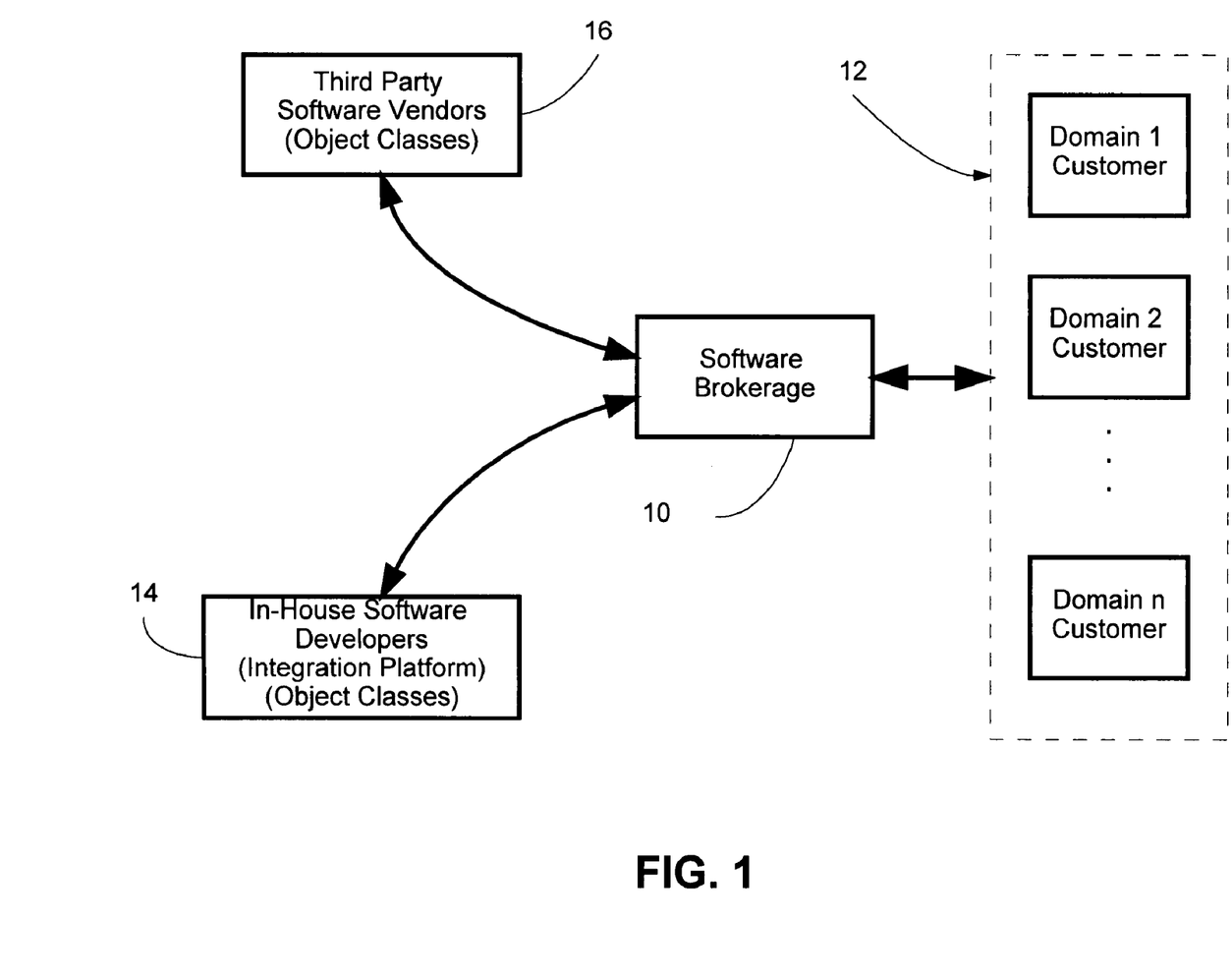
FIG. 1 is a schematic drawing depicting an exemplary software marketing/sales/distribution environment in which the present invention is implemented.

Turning now to FIG. 1, a schematic diagram depicts the basic components of an environment into which a new method for distributing, and billing for use of, software modules may be incorporated in accordance with the present invention. A software module is a data construct including at least an identifiable, integration-capable set of data and/or program instructions. An example of a software module is a data construct including an object class or set of classes from which objects are created and executed. Software modules may also include executables such as self-contained programs, dynamically linked libraries (DLLs), procedures, etc. The software modules include fields, described herein below, enabling tracking usage of the software modules at a customer site.

An "instance" is a copy of data and/or program code derived/copied from a software module. An example of an instance is an object created from an object class in a software module. Other examples of instances include copies of DLL's and executable program files.

A software brokerage 10 performs a number of services relating to developed software including: marketing, licensing, distribution and accounting. The software brokerage 10 carries out these services on behalf of a set of software customers 12 through both electronic and conventional sales channels. The software modules offered by the software brokerage 10 originate from in-house software developers 14 and third party software vendors 16. The services performed by the software brokerage 10 are described in greater detail herein below.

In an embodiment of the invention, the software customers 12 are associated with logical domains (1-n). Each logical domain relates to a particular industry or general software solution. By way of example, the software brokerage 10 engages in the marketing and distribution of industrial control system software for a variety of customers including for example: power plants, refineries, bakeries, chemical manufactures and pharmaceutical manufacturers. Each customer domain 12 (1-n) faces unique industrial control tasks requiring unique software packages. The challenge of meeting the needs of a vast spectrum of customers in a variety of environments is met by providing a software module integration platform (or "framework"). The software module integration platform serves as a foundation for creating, deploying, and monitoring execution of licensed software according to the terms of a license. The licensed software comprises a collection of software modules selected from a software module warehouse maintained by the software brokerage 10. The software module integration platform includes development tools enabling a customer to create and deploy instances, and a license manager which registers execution of the instances. The framework of the system includes platform objects, the communication between platforms, all engines, and deployment servers.

The software module integration platform is referred to herein in the singular form. However, those skilled in the art will readily appreciate that a software module integration platform may be present in various forms at different times and on different systems. The software module integration platform can be viewed as an operating system on top of an operation system. Like operating systems, the software module integration platform can take various forms. Thus it is contemplated that not only are multiple distinct software module integration platforms available to consumers, but subsequent versions of the platform can also be released over time.

Furthermore, while a customer typically has only a single software module integration platform installed on a system at a particular time, a customer system may have multiple distinct software module integration platforms (or compatible portions thereof) installed at the same time. In such cases, the multiple software integration platforms preferably share a common use registration protocol enabling use of a single license for the customer system.

In an embodiment of the present invention, a single business entity includes both the software brokerage 10 and in-house software developers 14. The in-house software developers 14 write and maintain the software module integration platform as well as a portion of the software modules deployed in conjunction with the integration platform to meet customers' needs. Other software modules, compatible with the software module integration platform, are developed by third party software vendors 16. The software brokerage 10 maintains the above-mentioned software modules and software module integration platform.

Figure 2:
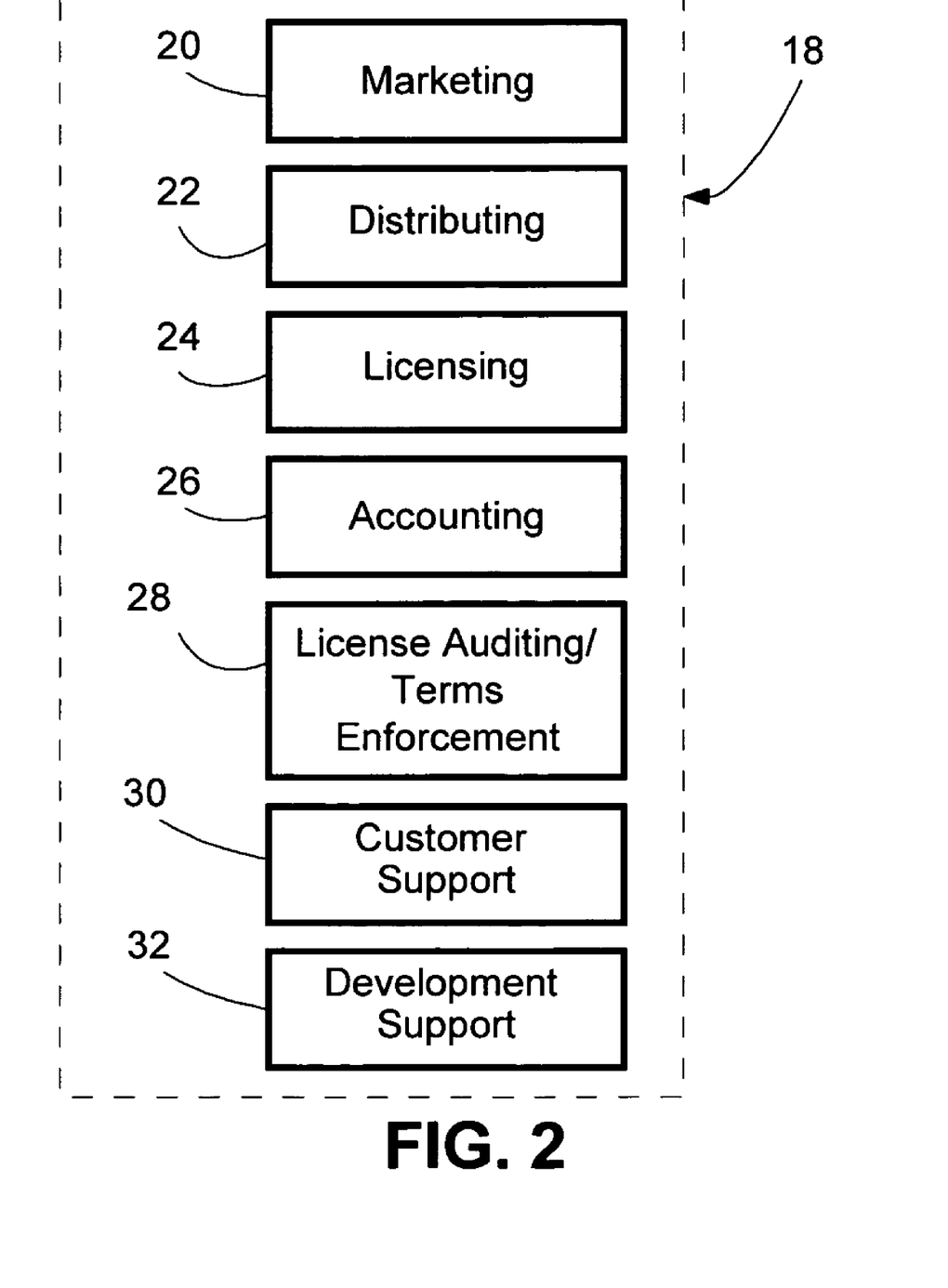
FIG. 2 summarizes the functions performed by an exemplary software brokerage facility.

Having described the general components of an environment embodying the present invention, attention is now directed to FIG. 2 which summarizes the functional components 18 performed by an illustrative example of the software brokerage 10. The software brokerage 10 receives software modules and provides the software to the customers 12. The software brokerage 10 carries out a marketing function 20 directed to software customers. The marketing function 20 includes advertising the software module integration platform as well as the software modules that are individually selected to run upon the platform. The latter software modules are typically directed to specific vertical markets such as manufacturing plants, refineries, power plants, etc. Even within those broad categories marketing may be directed to more specific customers such as breweries and milk processors. Advertising is carried out via an e-commerce (e.g., Internet) site as well as via conventional advertising media. The e-commerce site enables the software brokerage 10 to promote the software offerings to consumers via on-line product descriptions, inducements and discounts. One such function of the vertical marketing approach incorporated in the software brokerage 10 is to pre-package a bundle of software modules in an industry/application specific set.

The software brokerage 10 preferably offers software for license via an e-commerce site. The software offerings are organized into domain-specific software module offerings. For example, a potential customer requiring process control software for an oil refinery is directed to industrial process control software module listings in general, and then to refinery control software for more specific software module offerings.

In addition to advertising, the marketing function 20 includes obtaining consumer data which is collected and summarized in a database. In addition to gathering information regarding who is using the software and how it is being used (e.g., in a home business, school, etc.), the software brokerage 10 receives and stores information regarding how much the software is used and how the software is deployed in a system (e.g., at a server, an application engine, a view engine). The latter consumer data acquisition is facilitated by automated audit/monitoring processes incorporated within the software module integration platform.

A distribution function 22 is performed by the software brokerage 10 via conventional and e-commerce channels. Distribution of the software via the Internet expands the reach of the software brokerage 10 and reduces transaction costs associated with customers obtaining copies of offered software.

A licensing function 24 is performed by the software brokerage 10. In a preferred embodiment of the present invention, the software brokerage 10 maintains records of reported deployment and use of software modules downloaded by customers, as well as the terms under which the customers are authorized to use the downloaded software modules. This function is facilitated in part by a license manager. The license manager, a component of the software module integration platform at a user site, incorporates the software description and terms of use into a single enterprise license for the customer. As used herein, an enterprise may comprise an entire facility or some functional component thereof such as an assembly line. The license function 24 supports software authored by the in-house software developers 14, as well as software provided by the third party software vendors 16.

The licensing function 24 incorporates a revenue model wherein the primary source of income comes from customers' registered uses of licensed software modules physically present on their local systems. Use of software, as recited herein, is measured, for example, by registered events and is gauged in many ways including, for example: the number of unique instances created from a software module that were executed during a given period of time (e.g., a day, a week, a month, an hour, etc.), the number of copies of a program or data segment created from a particular software module, the quantity of output product generated by executing an instance created from a software module, or the amount of time a particular application was active (measured by a start time and finish time registered by a use monitor in the software module integration platform).

If the time period for a use-based instance is relatively long, then the charge to a customer for re-registering use may be substantial. In such cases, the software module integration platform may monitor upcoming termination dates for instances and notify the customer of an upcoming expiration date and seek confirmation that the customer wishes to continue using the software module/instance.

Additional income may be derived from including in the single license authorization to use other software modules for the life of the enterprise (i.e., lifetime software). Lifetime software includes the software module integration platform and tools and utilities provided to customers in a basic system software package. However, the set of software modules includes specialized software that could be licensed by use, but the customer has elected to pay a lifetime fee for the software. Thus, a single enterprise license may include both use-based and lifetime billed software modules. The licensing function 24 of the software brokerage 10 interacts with an on-site license manager to pro-actively address software piracy and unauthorized use by preventing a customer from violating the licensing terms when creating, deploying and executing instances from software modules, or otherwise using the software modules, on the customer's system.

An accounting function 26 is performed by the software brokerage 10. The accounting function 26 operates in conjunction with the distribution function 22 and licensing function 24 to track income and disbursements to third party vendors. The revenue accounting information is received and maintained by the accounting function 26. Customers are charged for credit units downloaded to the customer systems. The credit units are non-currency units utilized as a measure of value for executing instances. The credit units are then debited by the on-site license manager prior to enabling execution of instances created from software modules provided through the software brokerage. Third-party vendors and in-house suppliers who provided the licensed software are credited according to revenue sharing arrangements between the software brokerage 10 and the suppliers. In addition to accounting for customer use of software, the accounting function maintains a record of other revenue sources such as advertising fees for promotions on the network site accessed by the customers to view the software offerings and premium service/support fees charged to customers.

A license audit/terms enforcement function 28 is performed by the software brokerage 10 in conjunction with components of the software module integration platforms at customer installations. The software brokerage 10 includes communication components that communicate with license manager processes at customer installations to obtain reports regarding software module usage at the installations. The license audit/terms enforcement function 28 includes comparing the reported usage to the license terms maintained by the licensing function 24. A compliance report is generated indicating any violations of the license terms. The compliance report is provided to the customer and copied to a contract compliance department of the software brokerage 10. If a customer installation has violated any terms of the original license, then a warning is issued to the customer. Other warnings may concern a pending expiration of a license or alternatively, the expiration of time duration limitations placed upon use-based software modules.

A customer support function 30 is performed by the software brokerage 10. The customer support function 30 is carried out via on-line automated assistance as well as human assistance. The software brokerage 10 provides on-line tutorials instructing customers how to create, customize and deploy instances from the software modules. The customer support function 30 also includes further support via electronically searchable on-line references as well as live operators on-call to answer customers' questions. In cases where support functions are chargeable to the customer, the customer support function 30 interacts with the accounting function 26 to register these revenue generating events.

A development support function 32 is also provided by the software brokerage 10. The software brokerage 10 is responsible for enlisting third party software vendors to adopt the utility-based software billing paradigm embodied within the business model of the present invention. Thus, the software module integration platform is promoted and its software module interfaces are documented for the third party vendors. Design kits, authored by the in-house software developers 14, are distributed to vendors in consideration of an agreement to distribute the resulting software modules through the software brokerage 10 and share the resulting customer revenue. The development support function 32 also fulfills the task of reporting back to the in-house developers 14 any customer feedback arising from execution of any of the above-described functions.

The customers 12 are yet another focus of the development support function 32. A software module development environment is provided to the customers 12 as part of the software object integration platform. The software module development environment enables the customers 12 to configure and customize instances created from the downloaded software modules to adapt the software to particular applications (domains). Customers begin with a software module including a template and a set of options for filling in or augmenting the content of the software module template. For example a process control software module template includes slots into which a user designates pumps, valves, and heater controls and functions via a graphical user interface. Each of the customized software modules is further defined by a set of states, alarms, and parameters. The customer then exports the customized software modules into the process control environment and instances are registered with the license manager for the enterprise and then executed via the software module integration platform.

Figure 3:
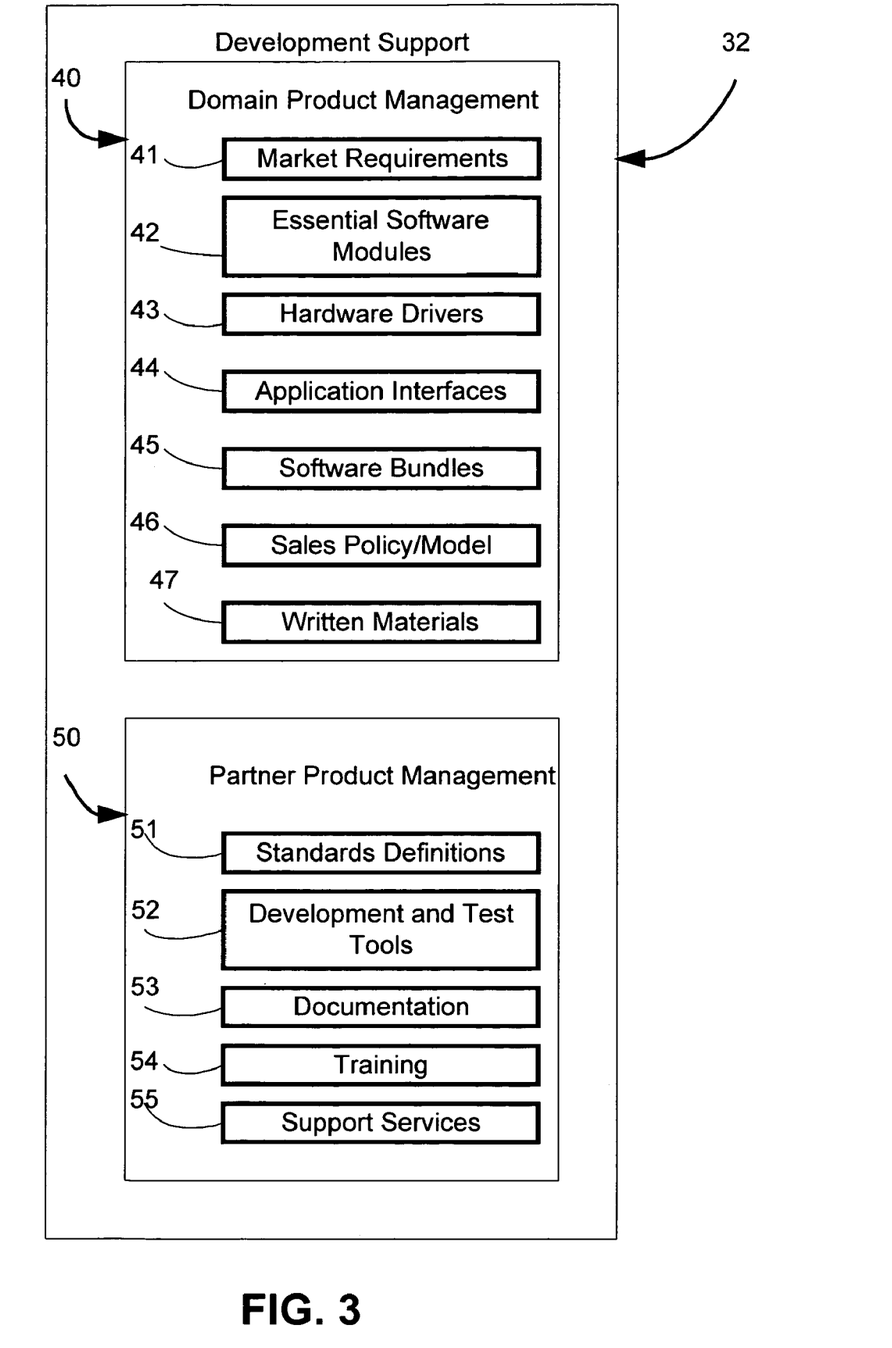
FIG. 3 summarizes specific functions performed under the development support function of FIG. 2.

Turning to FIG. 3, the development support function 32 is expanded and further details to this function are summarized with regard to development of software modules for installation upon and/or integration with the software integration platform. A domain product management function 40 drives development of software modules for specific user types and/or markets (referred to generically as domains). Market requirements 41 are defined and communicated to the in-house software developers 14 and third party software vendors 16. The domain product management function 40 also includes defining for a domain: software modules that are essential to a domain 42, drivers for domain-specific hardware 43, interfaces to other applications common to the domain 44, software bundles containing software collections likely to be used in the domain 45, a sales policy/model 46 for licensing software for the domain, and written materials 47 for advertising to and instructing customers in the domain.

A partners product management function 50 is primarily responsible for receiving the domain-specific requirements derived from execution of the domain product management function 40 and interfacing with the third party software vendors 16 and in-house software developers 14 providing complementary sources of software modules thus ensuring satisfaction of customers' needs by the software module offerings of the software brokerage 10. The partners product management function 50 includes defining standards 51 that must be met in order to meet certification for distribution to customers via the software brokerage 10. These standards address: program methodology, quality assurance, documentation, setup and installation. The partners product management function 52 also includes providing development and testing tools 52, documentation 53, training 54, and support services 55 to aid the third party vendors 16 and in-house software developers 14 in their efforts to meet the standards. The standards ensure uniform software module product offerings and create for the user an impression of a single source while in fact software modules come from many sources. It is noted that these functions are coordinated through the software brokerage 10; however, they are carried out at least partially by the in-house developers 14, and indeed may be carried out by yet another agent working with the software brokerage 10.

The software object integration platform is capable of running non-certified software modules of others. However, instances created from the non-certified modules will not register with a license manager at the customer's site or be monitored for use as part of the software modules utilized by the customer under the software module integration platform.

The partners product management function 50 includes arranging the terms for distribution of the third party software by the software brokerage 10. The terms cover the issues of: licenses, standards, quality assurance testing, product support, documentation, and indemnification. Compliance testing is placed primarily in the hands of the third party software developers by a set of test tools supplied under the authority of the software brokerage 10. In order to minimize transactional costs, the terms of agreements entered between third party software vendors 16 and the software brokerage 10 are formulated in advance for automated processing. If modifications are required to the formulated terms, then human negotiations supplement the automated process. The software brokerage 10, in addition to entering revenue sharing agreements with the third party software vendors 16, also purchases software developed by the third party software developers 16.

Figure 4:
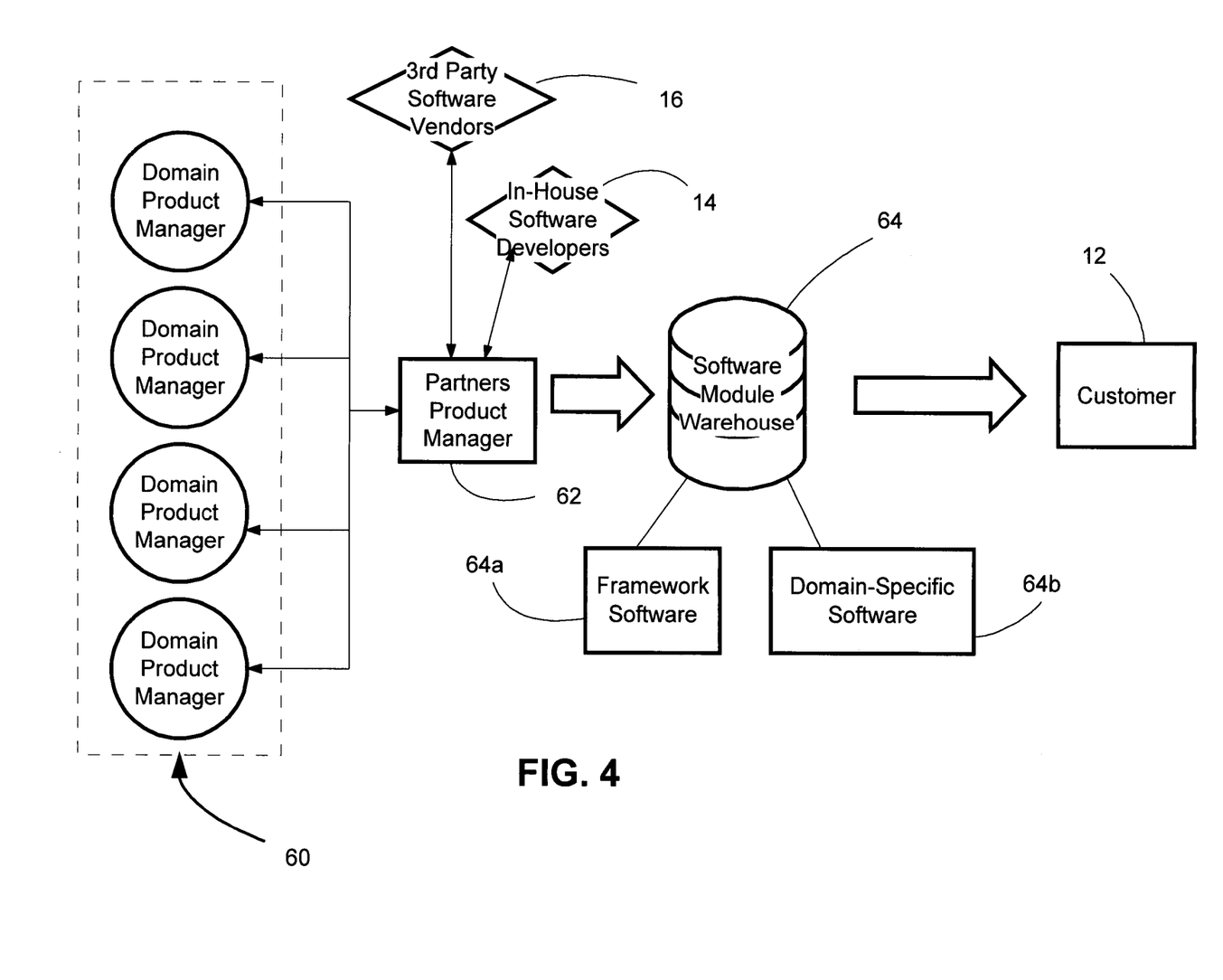
FIG. 4 is a schematic drawing summarizing the relationships of various entities in an exemplary software module development environment that integrates software developed by third parties into the software offerings to customers.

Turning now to FIG. 4, a schematic diagram depicts the production development relationships between a set of domain product managers 60, third party software vendors 16, in-house software developers 14 and a partners product manager 62. The partners product manager 62 receives domain-specific product development information from the domain product managers 60. The partners product manager 62 digests the information and forwards the digested information, in the form of market requirements and development standards to the in-house software developers 14 and, if appropriate, to the third party software vendors 16. In response, the in-house software developers 14 and third party software vendors 16 create domain-specific software modules meeting the market requirements and development standards dictated by the partners product manager 62. The partners product manager 62 receives the domain-specific software modules from the in-house software developers 14 and third party software vendors 16 and verifies compliance with the provided development standards. Thereafter, the partners product manager 62 passes verified software modules to the software module warehouse 64.

The warehoused software modules are made available to the customers 12 via e-commerce sites as well as conventional sales channels. In a preferred embodiment of the present invention, the offerings to the customers 12 include both framework software 64a (the software module integration platform and certain global software modules) and domain-specific software modules 64b. The framework software 64a and domain-specific software 64b are described below in conjunction with the written description of FIG. 5.

Figure 5:
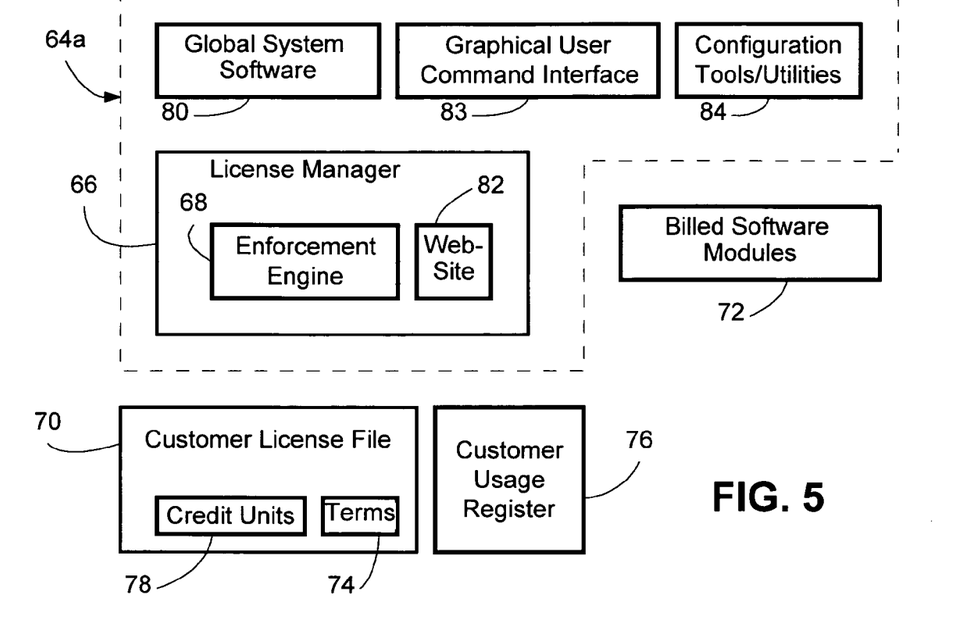
FIG. 5 summarizes the content of software and data at an exemplary customer site that utilizes a software module distribution/use scheme embodying the present invention.

Turning now to FIG. 5, software and data structures installed within a representative customer system are schematically depicted. The framework software 64a includes a license manager 66. The license manager 66 is the primary licensing component of the software module integration platform on the customer system and the core to the software module distribution model described herein. In a preferred embodiment, the license manager 66 resides on a central computer in a multi-computer enterprise. The license manager 66 includes an enforcement engine 68. The enforcement engine ensures compliance with a set of global licensing rules as well as specific terms of a customer license file 70 by a customer's use of billed software modules 72. In an embodiment of the present invention, the billed software modules 72 include domain-specific software directed to a particular group of potential customers.

The license manager 66 pro-actively enforces terms 74 of the customer license file 70 by detecting and recording use of the billed software modules 72 at the customer's site and reporting usage back to the software brokerage 10 at an e-commerce site. Failure of a license manager 66 to report back to the software brokerage 10 within a time period is registered as a communication failure. In a preferred embodiment, processes associated with a platform object within computers executing instances created from the billed software modules 72 report usage to the license manager 66. The license manager 66 records the usage and the instances are thereafter executed. In addition to the terms 74, the license manager 66 includes its own set of licensing rules that are enforced in tandem with the terms 74 by the enforcement engine 68.

In a preferred embodiment "use" of the software modules 72 takes the form of executing objects (instances) created from object classes provided within the software modules 72. In other embodiments, use may be registered when an object is created. The license manager 66 records information regarding created objects, including the number of instances, the location of the instances, the operator that created them, and basic object identification information. This information is stored in a usage register 76.

The license manager 66 ensures that the customer has sufficient credit units 78 to deploy/execute objects. For example, if an application at a user's site attempts to execute an object that will cost 100 credit units, but the user has only 70 credits, then the license manager 66 will inform the user that insufficient credit is available and then deploy the object in a limited "demonstration" mode. The license manager 66 actively prompts a user to comply with the terms of the license file 70, to maintain sufficient credit to use the billed software modules 72, and to notify a user when the license is about to expire and to therefore establish a new license file 70 (e.g., remind the customer/user to re-order additional credit). The license manager 66 carries out these notification methods via e-mail messages and direct network messages to user terminals at the customer site. At least two responsible "owners" of the system are notified to ensure notification in the event that a first owner is not available.

Global system software 80 and license manager 66 provide the facilities for the user "owners" and maybe the software brokerage 10 to monitor information in the usage register 76. In addition to notifying the brokerage 10 with regard to customer compliance, the information from the usage register 76 is used by the software brokerage 10 as a source of market information to identify market trends and customer needs. This information is provided to developers by the software brokerages in raw data form as well as market requirements to aid the developers efforts to provide improved software products.

The license manager 66 has a unique network location through which a user submits queries and the license manager 66 reports information relating to the terms of the license, costs of deploying objects, and remaining credit in the customer's credit units 78. The license manager 66 stores and issues reports including operation summary (trend) and object deployment data via department, manufacturing line, etc. The unique network location is preferably carried out in the form of a built-in network site 82 (e.g., a Web site) for each license manager 66, which enables access to the stored data in the license manager 66 and usage register 76. Pre defined reports and customized reports enable a simple, yet powerful method of administering the licensing system. From the network site 82 one can extract the above mentioned use information as well as request additional credit units, license term revisions, and license renewal. The mode of access includes well-known RAS connections and local network connections enabling information technology managers to monitor details regarding use of the software modules 72 and deployed objects.

The customer license file 70 has the following traits. The customer can access its contents to read its information; however, the customer cannot modify its contents. Furthermore, in a preferred embodiment the operation of the license manager 66 at any point in time supports a single customer license file. An upgrade file cannot replace the customer license file 70 unless the upgrade file includes proper identification of the customer license file 70. The customer license file 70 includes a non-modifiable date code that requires the customer license file 70 to be installed within a set time (e.g., 30 days) from the creation date. The license file 70 cannot be loaded after the set time period expires. This prevents others from obtaining a copy of the license file for use on an unauthorized system.

In an embodiment of the present invention, the license manager 66 is initially disabled and the license file 70 enables the license manager 66 thereby allowing the license manager 66 to authorize deployment and execution of object instances from a set of object classes within the billed software modules 72. Thus, the customer's system will not operate without a valid license file 70. Therefore, the likelihood that an authorized user will successfully load a license file intended for another customer is unlikely after the set period has expired for loading the license file.

Completing the description of FIG. 5, the framework 64*a* includes a set of basic software modules that are generic to operation of the customer's system for which the customer is not billed on a usage basis. The basic software modules are included in the global system software 80. A graphical user command interface 83 and configuration tools/utilities 84 are provided to allow an information technology professional to set up and test the objects created from the billed software modules 72. The global system software 80 also includes the platform object class that gives rise to the aforementioned platform object installed on computers to facilitate creation of object instances from the billed software modules 72. The platform object also communicates with the license manager 66 to ensure that execution of an object is consistent with the license terms and existing credit.

Figure 6:
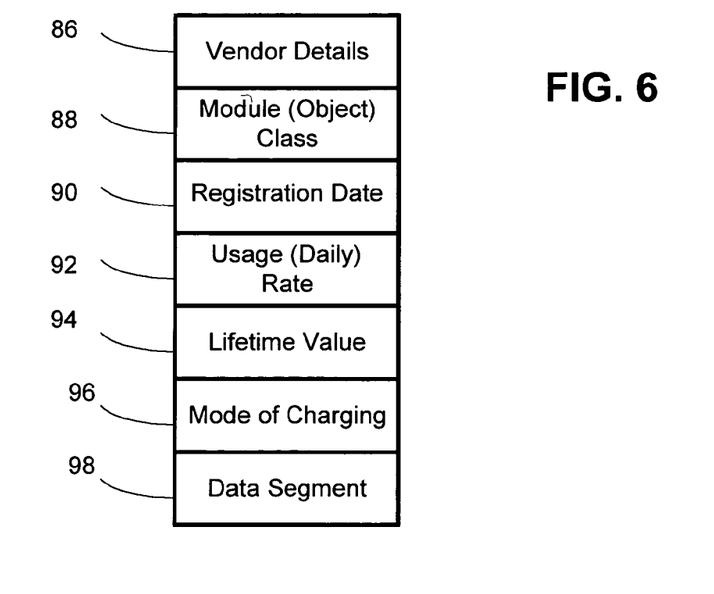
FIG. 6 is a schematic drawing of an exemplary instance (an object) created from a software module (object class) deployed at customer sites in accordance with an embodiment of the present invention.

The content of an instance (object) created from one of the billed software modules 72 is summarized in FIG. 6. The software modules 72 from which instances are deployed are preferably object classes including data and program code for creating objects of the form and functionality described herein below. The software modules 72 can be authored/modified in either an integrated developer environment (IDE) or using software development toolkits. The object classes are then submitted to the software brokerage 10 for quality assurance validation, marketing, and/or distribution.

Turning now to the fields of an object instance, a vendor details field 86 identifies the source/creator of the software module used to create the object and miscellaneous information that the source of the software module wishes to include such as contact information. A module class field 88 identifies the object class from which the object was created. A date of registration field 90 identifies the date in which the object was first created from an object class. Alternatively, the date of registration field 90 represents the date in which the object was first executed. Creation and execution of an object can be considered uses of the underlying object class (software module).

The next set of fields address the issue of billing a customer for executing object instances created from the billed software modules 72. A usage rate field 92 specifies the amount a customer is charged for using the object. In an embodiment of the present invention, usage is broken down into a daily rate. A daily rate is merely one of many possible ways to charge for use of software modules, and thus the rate need not be calculated on a daily use basis. For example, the present software deployment and billing method is incorporated into an industrial manufacturing information and/or automation environment. A customer is charged each time a particular object is created from an object class and then executed on the process control system. The object for which use is monitored and registered by the license manager 66 may be a process output/throughput monitor object that facilitates billing a customer for all installed software modules based upon the units of output generated by an industrial process as reported by the output/throughput monitor object. The units may comprise gallons of gasoline, tons of grain, etc., as measured by a monitored process variable object.

A lifetime value 94 specifies the amount a customer is charged on a one-time basis for the object no matter how many days it is used. A mode of charging field 96 identifies how the customer wants to be charged for using objects created from the domain-specific software—by use or by lifetime value.

The mode specified in the mode of charging field 96 determines the basis upon which created objects report to the license manager 66. If a usage rate mode is specified, then the object is accounted for each time a billable event has occurred. In the case of a daily usage rate, the platform object reports usage the first time the billed object is used each day. If a lifetime rate mode is specified, then the platform object reports only the first time the billed object is used. Thereafter, additional uses of the billed object are not registered as billable events. If a demo mode is specified, then the object is allowed to operate for a limited time period without registering a billable event. Because each object is provided its own mode designation field, a user is not confined to selecting either a pay as you use system or a pay in advance system. Instead, the user may select certain files for a lifetime mode while licensing others in the usage mode.

A data segment 98 contains the actual data and/or program code used in the customer's operating environment. In an object-oriented environment, the data segment 98 includes a set of object classes from which a set of objects are created by processes associated with the customer's software module integration platform.

Figure 7:
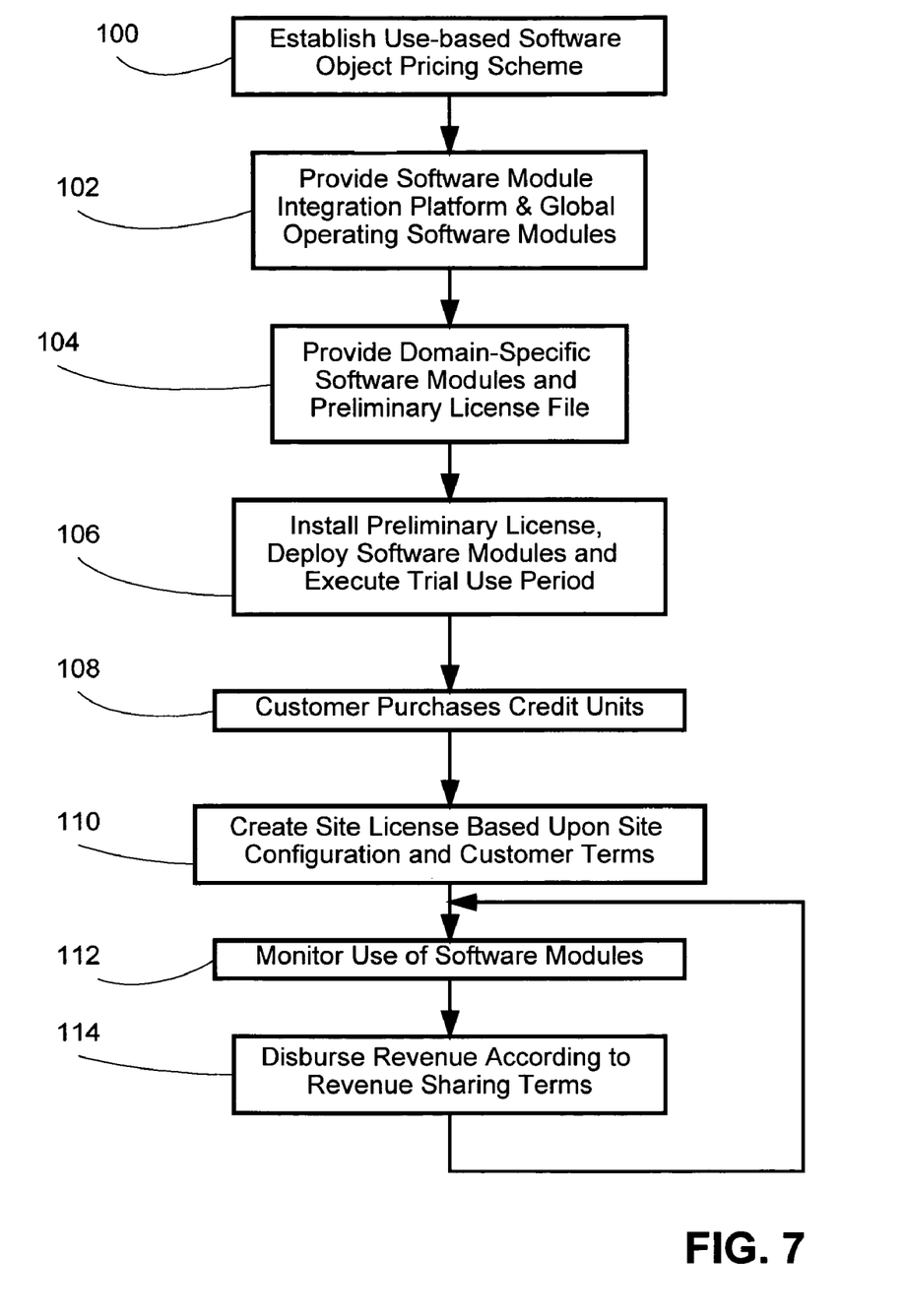
FIG. 7 is a flowchart summarizing the steps performed to distribute and manage software modules at customer sites in accordance with the present invention.

Turning now to FIG. 7, a flowchart summarizes the steps performed in accordance with a software distribution scheme embodying the present invention. The sequence of steps is exemplary as those skilled in the art will readily appreciate that the summarized steps are interchangeable and repeatable during the course of existence of an agreement to use software modules at a particular customer site. During step 100 the software brokerage 10 establishes a use-based software object pricing scheme. The pricing scheme includes individually setting one or more prices based upon use of the software module after it is downloaded to the customer's site. As previously explained there are many ways in which to price software module use including, by way of example: time-based, output-based, and per instance (an instance in this case is a collection of data and/or program code derived from the software module's data segment 82). An example of an instance is an object created from an object class in a software module. In the case of object classes, a use corresponds to creating/executing an object from an object class.

During step 102, a customer goes to an outlet serviced by the software brokerage 10 such as an e-commerce Internet site. The outlet provides software modules (e.g., object classes) grouped into functional sections. A number of software modules from different parties are presented for a same purpose. A user selects the combination of software modules that best fit the customer's needs. In response to the customer's order, the software brokerage provides a framework package. The framework package includes the software module integration platform, generic programs, and global object classes that are appropriate to all customers. For example, the generic offerings include basic view engines, communication packages (for network environments), and generic user configuration and development tools. The software module integration platform includes processes for enabling deployment of instances from downloaded software modules and for monitoring software usage at the customer's site.

During step 104, the customer selects, and the software brokerage provides, a set of software modules (e.g., object classes) to the customer. This set of software modules includes the materials that in combination with the materials provided during step 102 enable a customer to implement a complete software solution at the customer's site. The set of software modules includes both completely functional object classes as well as object class templates that are customized and saved by users using IDE tools supplied during step 102. A user may, without charge, create and edit instances using the IDE tools. In an embodiment of the invention, use is registered at the time the instances are executed. A preliminary license file is provided to the customer. The preliminary license file is usable for a set period and will be superceded by a permanent license file when the customer purchases sufficient credit to enable the system deployed at the customer site.

During step 106 the customer installs the preliminary license file to enable the license manager to deploy object instances from the downloaded software modules. The customer then deploys the software and/or data associated with the software modules using the configuration/development tools. An estimator tool provides a running total of the cost for the customer's proposed configuration. In some installations, such as in an industrial process control environment, the customer desires a high level of confidence that the new software will operate as intended. Therefore, prior to deploying software and data, the software configuration is tested through simulation and debugger tools to ensure that the system will operate properly. Step 106 may take place over a period of hours, days, weeks, or even months in the case of complex systems. In accordance with an embodiment of the present invention, during the configuration process performed during a demonstration period, a user is entitled to use the software modules to create as many instances, i.e., objects or copies of software and/or data as the user desires without incurring additional costs for the software use.

During the demonstration period, the user is not charged for executing instances that would normally be billed. However, each time an instance is executed, the event is registered with the license manager 66. During the registration process, the license manager 66 determines a termination date associated with the demonstration period for the instance. If the demonstration period has expired, then the instance cannot be executed.

After defining a deployment scheme, at step 108 the customer purchases sufficient credit to carry out the deployed system. For example, the customer uses the estimator tool to establish a cost for operating an estimated number of objects for a quarter year. The estimate includes any other applicable fees such as support services. The user contacts the software brokerage 10 and purchases sufficient credit for the time period of interest to the customer depending upon how frequently the customer wishes to make payments to the software brokerage 10. If the estimate is exceeded during the course of the quarter, then the license manager 66 notifies the customer and software broker 10. In an embodiment of the present invention, the customer is allowed to have a negative value for credit units within an level agreed between the broker 10 and the customer. The overage is factored into the next quarter estimate and up-front payment.

At step 110, the software brokerage 10 creates a permanent license file and downloads it to the customer. The customer loads the permanent license file on the system and deploys instances (e.g., objects) created from the software modules (object classes) according to the proposed scheme. The entry of a permanent license does not bar the customer from adding to the presently deployed objects. Assuming the customer has sufficient credit units, the user may add to the original list of licensed objects. In the event that a new license is needed, the software broker 10 downloads a new license for the customer. An example of such an event is adding new control components to a process control system.

During step 112, the license manager 66, located at the customer's site, monitors and records software module usage (measured, for example, by execution of objects created from the object classes), updates the customer usage register 76 and debits value from the customer's credit units 78 according to the usage rates for instances (e.g., objects) created from the billable software modules 72. The usage data gathered by the on-site license manager is applied to the license terms 74 to ensure that the use is in accordance with the terms of the license entered at step 110. The contents of the usage register 76 facilitate record keeping for the use-based billing, facilitate distribution of licensing proceeds with third party software vendors, and to facilitate market research analyses that include detailed customer usage information.

During step 112 usage is charged to the customer according to the billing mode selected by the user at the time the system was configured during step 106. When a usage mode object is to executed, processes on the platform object installed on the computer that will execute the usage mode object report the proposed use to the license manager 66. In response the license manager 66 debits a value from the credit units 78 equal to the usage rate for the usage mode object if appropriate and then grants the platform object processes permission to execute the object.

If the usage rate is based upon daily usage, then the object reports each time it is executed. However, the license manager only charges the customer for the first execution of the object each day. For example, each time a control room monitor is activated, a view engine object is executed corresponding to the activated monitor. The execution event is reported to the license manager 66, and the customer is charged each day in which the view engine object is executed. Other monitored objects include production engines, database servers, network gateways and other interfaces. Virtually any object class can be monitored to become a billable resource by integrating reporting/monitoring functionality into object execution.

When a lifetime mode object is executed, the use is reported to the license manager 66. However, the license manager 66 debits value from the credit units 78 only if the lifetime mode object has not previously reported. It is noted however that only one lifetime object can be deployed at any single time if only one "lifetime" has been purchased. If multiple instances are to be executed concurrently, then a separate charge is debited for each one of the multiple instances. Finally, demo mode objects register with the license manager 66 when they are executed to determine whether their usage period has expired. However, their use is not charged to the customer. Registration of object execution with the license manager 66 can be performed by the platform object processes or alternatively by functionality built into the executed billed objects themselves.

Monitoring for billing purposes, as noted briefly above, occurs concurrently with execution of objects from the object classes in a tamper-free environment. The license manager process at the customer site receives notification of, and registers, billable events such as execution of objects from individually billed object classes, expiration of a timer associated with a particular object or set of objects, or passage of a particular quantity of material through a monitored process.

During step 114, performed periodically, the software brokerage 10 receives from the license manager 66 the data from the customer usage register 76 and distributes payments to distributors, salespersons, and third party vendors according to usage of the objects and their source. The software brokerage 10 generates a report summarizing use of software modules at the customer site based upon the received contents of the customer usage register 76. Distribution schemes are discussed in association with FIG. 8. As previously explained, the software used by the customer may include software supplied by third-party vendors 16 with which the software broker 10 has entered revenue sharing arrangements. During step 114 if the software brokerage 10 determines that such arrangements apply, then the software brokerage 10 credits accounts of appropriate vendors 16. Independent distributors are credited for payments due under a commission scheme. If organization accounting is split between research/development and sales, then the in-house software developers 14 and sales personnel are treated as third party entities for purposes of revenue sharing. The monitoring/billing process is intended to continue until the controlling license terminates through breach of its terms or expiration. Thus, control passes from step 114 to the monitoring step 112.

Figure 8:
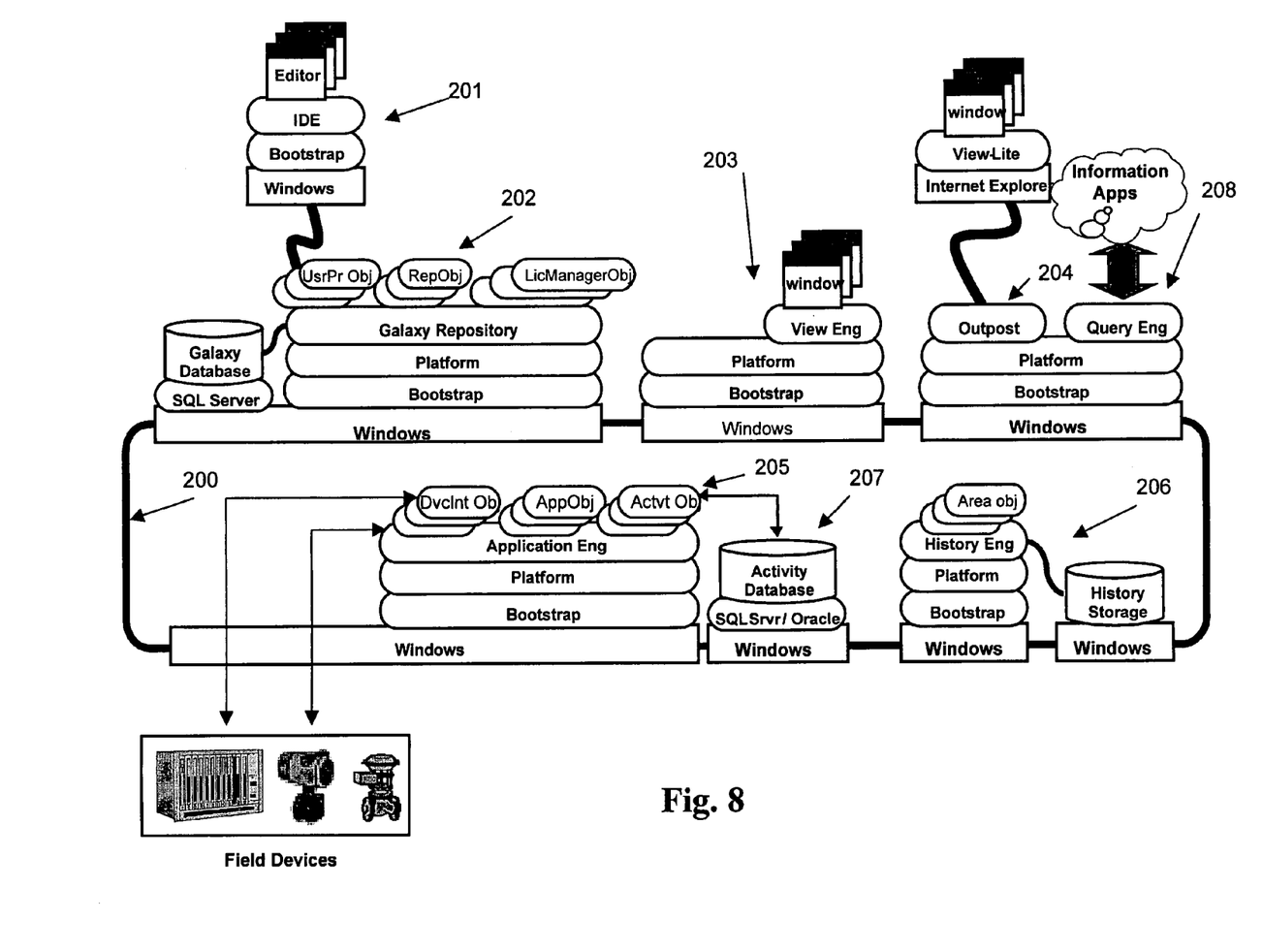
FIG. 8 is a schematic drawing depicting an exemplary customer site to which a framework and software modules are distributed in accordance with an embodiment of the present invention.

FIG. 8 schematically depicts an exemplary industrial manufacturing information and automation network environment in which the software module integration platform utilizes a set of software modules to create and deploy a set of program objects and/or processes to carry out the functions of the network. The network depicted in FIG. 8 is an example of an industrial process control system and includes a local area network link 200 that provides a communication path between a configuration database "Galaxy" server 202, a set of user terminals 203, a external gateway 204, an application engine 205, and a plant data server 206, and a query engine 207. As noted in the drawings of the exemplary embodiment, each of the above computing entities depicted in FIG. 8 utilizes a MICROSOFT WINDOWS operating system and includes bootstrap software. The bootstrap software contains core software that must be loaded onto the computers before the remainder of the software object integration platform can be installed—in particular the platform object (also identified in the drawing as being installed upon each computer).

The exemplary embodiment includes a configuration database server 202 having a galaxy repository object. An IDE 201 provides the development environment for configuring software in a system. In conjunction with the configuration database server 202 the IDE 201 executes development tools enabling a customer to define and configure objects for the network based upon software modules obtained from the software brokerage 10. The galaxy repository object within the configuration database 202 includes the license manager 66 which executes monitoring/billing operations with regard to the software modules used in a system. Thus, the "Galaxy Repository" creates, deploys, and monitors a set of objects on the network associated with software modules provided by the software brokerage 10.

The system will typically have many user terminals 203, used to monitor the status of various aspects of an industrial process via a human-computer interface. The user terminals 203, including view engine objects, act as the human machine interface (HMI) workstation for a manufacturing process/plant.

The external gateway 204, represented by an outpost object, provides links to remote computers, situated outside the industrial process control via wide a area network, Internet, etc.

The application engine 205, including an application engine object, manages/executes a set of objects and processes arising from the software modules maintained by the license manager 66. The application engine 205 directly hosts links to process I/O points corresponding to field devices such as process variable transmitters, valves and burner controls, and executes the appropriate functions against the returned I/O values.

The history repository 206, including a history engine, stores all time series data, required to provide a history of the plant and process, this is process data, alarms, events etc. The activity database 207 stores all production related events and activities. A query engine 208 provides database clients access to live, historical, and configuration data as if it was stored on a single relational database.

Illustrative embodiments of the present invention and certain variations thereof have been provided in the Figures and accompanying written description. Those skilled in the art will readily appreciate from the above disclosure that many variations to the disclosed embodiment are possible including for example using program structures other than object classes as the base for creating instances. While a series of steps have been summarized for carrying out a software distribution scheme, steps may be added, removed or modified without departing from the scope of the invention. The development and distribution environment disclosed herein is exemplary as well. The present invention is not intended to be limited to these embodiments. Rather the present invention is intended to cover the disclosed embodiments as well as others falling within the scope and spirit of the invention to the fullest extent permitted in view of this disclosure and the inventions defined by the claims herein below.

What is claimed is:

1. A method for charging customers for use of software comprising the steps of:
   establishing a use-based pricing scheme for a set of software modules;
   distributing the set of software modules to a customer, wherein the set of software modules comprise at least one object class from which objects are instantiated on a customer system;
   monitoring customer use of the software modules; and
   charging the customer according to use of the distributed software modules as determined during the monitoring step, wherein software usage is measured according to object instances created from the at least one object class.

2. The method of claim 1 wherein the customer creates a number of instances from a software module, and use of the software module is measured according to instances detected at a site of the customer during the monitoring step.

3. The method of claim 2 wherein instances created from a software module are periodically accessed to determine use during the monitoring step.

4. The method of claim 3 wherein the monitoring step comprises registering each day that an instance created from a software module is active; and wherein the charging step comprises charging the customer a daily rate for use of the software module.

5. The method of claim 1 further comprising the step of providing a demonstration mode for instances such that instances in the demonstration mode are executable at a customer site without charge.

6. The method of claim 1 further comprising maintaining a single agreement governing use of instances created from the set of software modules for an enterprise.

7. The method of claim 1 further comprising the step of monitoring a termination date for instances derived from a software module having a time-limited duration.

8. The method of claim 7 further comprising the step of issuing a warning in response to detecting an upcoming expiration date for an instance of a software module.

9. The method of claim 1 further comprising the step of maintaining an account for storing units of credit for a customer; and wherein said charging step comprises decrementing the customer's credit account by an appropriate number of units of credit based upon said monitoring step.

10. The method of claim 1 further comprising the step of generating a report summarizing use of software modules at the customer site.

11. The method of claim 1 wherein the charging step is based upon registered uses of a software module.

12. The method of claim 11 wherein the registered uses of a software module are measured according to execution of an instance created from the software module.

13. The method of claim 11 wherein the software module is an object class for creating an application engine object.

14. The method of claim 11 wherein the software module is an object class for creating a view engine object.

15. The method of claim 1 wherein the monitoring step comprises determining a time duration that an object instantiated from a software module is active.

16. The method of claim 1 wherein the monitoring step comprises registering execution of an instance that tracks throughput of a process.

17. The method of claim 1 wherein individual ones of the set of software modules are individually priced.

18. The method of claim 1 wherein the set of software modules includes at least a first software module supplied by a third party vendor and further comprising the step of:
compensating a third party vendor based upon a use by a customer of the first software module determined during the monitoring step.

19. The method of claim 1 wherein the distributing step comprises transmitting the set of software modules via a network connection.

20. The method of claim 19 wherein the network connection comprises an Internet connection.

21. The method of claim 1 comprising a step of reporting usage information to a software brokerage facility.

22. The method of claim 21 wherein the reporting step includes identifying the location of an instance created from a software module.

23. The method of claim 1 comprising the step of determining that a license manager has not reported to a software brokerage facility and in response registering a communication failure at a central licensing facility.

24. The method of claim 1 wherein the monitoring step includes storing use information in summary format in a database.

25. The method of claim 1 further comprising the step of issuing a re-ordering reminder to a customer.

26. The method of claim 1 wherein the software modules relate to industrial manufacturing automation software.

27. The method of claim 1 wherein the software modules relate to industrial manufacturing information software.

28. The method of claim 1 further comprising maintaining an agreement governing use of instances created from the set of software modules for an enterprise wherein the instances comprise both lifetime billed and use-based billed instances.

29. The method of claim 1 further comprising the step of providing configuration tools enabling a user to create customized instances from the software modules.

30. A method for vending software in the form of software modules via electronic commerce channels comprising the steps of:
maintaining an electronic commerce site including a software module selection interface, the software module selection interface enabling a customer to request a software module for use at a customer site, wherein the software module comprises at least one object class from which objects are instantiated on a customer system;
providing a software module management framework to the customer for installation at a customer site, wherein the management framework includes components for registering use of the software module at the customer site; and
charging the customer based upon registered use of the software module, wherein software module usage is measured according to object instances created from the at least one object class.

31. The method of claim 30 wherein the use of the software module comprises executing an instance created from the software module.

32. The method of claim 30 wherein the use of the software module comprises creating an instance from the software module.

33. The method of claim 30 wherein registering use of the software module provides a measure of throughput of an industrial process.

34. The method of claim 30 wherein the module management framework supports creation of instances from software modules at the customer cite having differing use modes including at least: a lifetime mode and a use-based mode, and wherein said method comprises the further step of registering execution of instances operating in the use-based mode.

35. The method of claim 34 wherein the use-based mode is measured in days and wherein an instance operating in use-based mode is registered each day in which the instance is executed.

36. A method for charging customers for use of software comprising the steps of:
providing a set of individually identifiable units of software comprising at least one object class from which objects are instantiated on a customer system;
individually pricing ones of the set of individually identifiable units of software;
authorizing use of the executable software; and
charging a customer based upon use of selected ones of the set of individually identifiable units of software, and wherein software usage is measured according to object instances created from the at least one object class.

37. The method of claim 36 wherein the authorizing step comprises transmitting a license file containing code enabling use by the customer of the executable software.

38. The method of claim 36 further comprising the step of:
integrating self-monitoring process software within the executable software; and
registering use of the executable software by the self-monitoring process.

39. The method of claim 36 wherein the executable software is industrial automation software.

40. The method of claim 36 wherein the self-monitoring process software comprises functions for informing the customer of a need to reorder credit to continue using the executable software.

41. A method for charging customers for use of software comprising the steps of:
first providing a set of software modules for software customers, wherein the set of software modules comprise at least one object class from which objects are instantiated on a customer system;
second providing a software licensing facility including a brokering facility through which software customers pay for software execution units, and wherein the brokering facility includes a set of software customer accounts; and charging a software customer account a number of software execution value units based upon the value of software modules utilized by a customer, and wherein software module usage is measured according to object instances created from the at least one object class.

42. The method of claim 41 wherein the charging step is performed by an automated billing process.

43. The method of claim 41 comprising the further step of providing an on-line customer interface; and wherein the first providing step includes the step of providing a network interface enabling users to download software modules from a remote location.

44. The method of claim 11 wherein the registered uses of a software module are measured according to creating an object instance from the software module.

45. The method of claim 41 wherein the use of the software module comprises executing an object instance created from the software module.

46. The method of claim 41 wherein the use of the software module comprises creating an object instance from the software module.

47. The method of claim 41 wherein registering use of the software module provides a measure of throughput of an industrial process.

* * * * *